Jan. 13, 1970 E. S. CHARTOUNI ET AL 3,489,520

TITRATION RECORDING APPARATUS

Filed April 12, 1965 8 Sheets-Sheet 1

INVENTORS
ELIE S. CHARTOUNI
GARFIELD A. DAWE by: Wallenstein, Spangenberg, Hattis & Strampel
ATTYS.

INVENTORS
ELIE S. CHARTOUNI
GARFIELD A. DAWE by: Wallenstein, Spangenberg, Hattis & Strampel
ATTYS.

INVENTORS
ELIE S. CHARTOUNI
GARFIELD A. DAWE
by: Wallenstein, Spangenberg, Hattis & Strampel ATTYS Jan. 13, 1970 E. S. CHARTOUNI ET AL 3,489,520

TITRATION RECORDING APPARATUS

Filed April 12, 1965 8 Sheets-Sheet 4

INVENTORS
ELIE S. CHARTOUNI
GARFIELD A. DAWE
by: Wallenstein, Spangenberg, Hattis & Strampel
ATTYS.

INVENTORS
ELIE S. CHARTOUNI
GARFIELD A. DAWE
by: Wallenstein, Spangenberg, Hattis & Strampel
ATTYS.

INVENTORS
ELIE S. CHARTOUNI
GARFIELD A. DAWE
by: Wallenstein, Spangenberg, Hattis & Strampel
ATTYS.

INVENTORS
ELIE S. CHARTOUNI
GARFIELD A. DAWE by: Wallenstein, Spangenberg, Hattis + Strampel
ATTYS.

INVENTORS
ELIE S. CHARTOUNI
GARFIELD A. DAWE
by: Wallenstein, Spangenberg, Hattis & Strampel
ATTYS.

United States Patent Office 3,489,520

Patented Jan. 13, 1970

3,489,520

TITRATION RECORDING APPARATUS

Elie S. Chartouni, Chicago, and Garfield A. Dawe, Northbrook, Ill., assignors, by mesne assignments, to Sargent-Welch Scientific Company, Skokie, Ill., a corporation of Illinois Filed Apr. 12, 1965, Ser. No. 447,413
Int. Cl. G01n 31/16
U.S. Cl. 23—253 13 Claims

ABSTRACT OF THE DISCLOSURE

In a pH titration apparatus including pH detecting electrodes to be inserted into a solution having a pH which tends to vary in a given direction, there is provided a manually adjustable calibrated voltage source for pre-setting a voltage output representing the output of the electrodes at any one of a number of pH values on opposite sides of a neutral pH. Means are provided for feeding to the test solution a titration material which opposes the change in pH of the test solution, the feeding rate of the titration material being controlled in accordance with a measured difference between the pre-set voltage and the voltage output of the detecting electrode, the feeding rate being zero when this difference is zero and increasing progressively with the difference between these voltages. Recording means are provided for recording the amount of titration material fed to the test solution with time.

This invention relates to titration recording apparatus. It has its most important application to a titration recording apparatus frequently referred to as a recording pH stat, which is a device designed for research and routine studies of reaction kinetics and stoichometry by high-precision recording of reaction progress with respect to time under closely controlled conditions of temperature, mixing and pH or electrode potential.

The recording pH stat operates on the principle of the maintenance of a constant pH in a test solution undergoing a chemical reaction or ezyme activity tending to change its pH by feeding to the test solution controlled amounts of a liquid titration material which opposes the change in the pH and maintains the original pH of the test solution. PH detecting electrodes extend into the test solution and provide a voltage which is a measure of the pH of the solution. The output of an adjustable voltage source is compared with the output of the electrodes, and liquid titration material is fed into the test solution whenever a finite difference exists between these two voltages. A recorder is provided to keep a continuous record of the quantity of titration material fed to the test solution. Usually, a pen or other recording device is caused to move across a moving record strip so that the amount of movement of the pen from a reference point is a measure of the quantity of titration material fed to the test solution. In this manner, the rate of reaction of the test solution is recorded.

The titration material is generally carried in a burette into which a motor driven plunger extends. A feed tube extends from the upper portion of the burette into the test solution, so that movement of the plunger toward the top of the burette will progressively displace titration material from the burette into the feed tube, which discharges the titration material progressively into the test solution. The energization of the motor which controls the movement of the plunger in the burette is controlled by a motor control circuit which responds to the aforementioned difference voltage (i.e. the difference between the output of the pH detecting electrodes and the adjustable voltage source).

When titration material is fed into the test solution, it takes a finite time for this material to disperse throughout the solution. Means for stirring the solution is provided for minimizing this time. The voltage output of the pH detecting electrodes will, accordingly, lag somewhat behind the actual pH conditions of the test solution and an excessive amount of titration material will frequently be fed to the test solution because of this, and, after complete dispersion of the titrant, a difference voltage results which has a reverse polarity to the voltage which initiated the feeding of the titrant. If a conventional servo motor control circuit is used to drive the plunger in a direction determined by the polarity of the difference voltage, the plunger will reverse direction (i.e. be moved downward) in the burette which would create a back pressure or suction which would withdraw part of the test solution into the titration feed tube and burette, thereby contaminating the titration material.

To avoid contaminating the titration material, a non-polarity responsive relay operated motor control circuit was developed which, upon energization of the relay, fed energizing voltage to a constant speed motor which operated the motor in only one direction. The relay was energized when the difference between the output of the electrodes and the adjustable voltage source reached a given small value. Such an on-off type control circuit has serious drawbacks from the standpoint of the accuracy obtainable. Thus, close control over the quantity of titration material fed to the test solution is difficult if not impossible to achieve, because, among other reasons, the minimum quantity of titration material feedable into the test solution is determined by inertial limitations of the relay and constant speed motor. Consequently, these relay operated systems have accuracy limitations which have commonly been no better than about ±0.1 pH, when accuracies of ±0.01 pH are frequently desired.

It is, accordingly, an object of the present invention to provide a recording pH stat (or analogous titration recording apparatus) where the contamination problem referred to is alleviated without sacrificing accuracy or sensitivity so that accuracies as high as ±0:01 pH are readily obtainable.

Generally, in titration recording apparatus it is necessary to maintain a close control over the temperature of the test solution. To this end, it was conventional to use a beaker or test cell which had a water jacket in which was circulated water fed thereto from a separate vessel associated with temperature control equipment which controlled the water temperature. Such equipment was very cumbersome and required that the titration recording apparatus be located in the vicinity of the temperature control equipment. It is, accordingly, another object of the present invention to provide a titration recording apparatus wherein the temperature control equipment is greatly simplified and integrated with the titration recording apparatus.

Another object of the present invention is to provide titration recording apparatus as described wherein the apparatus is not only more accurate than similar equipment heretofore developed, but is more compact and easier to change test solutions, fill and empty the burette containing the titration material and is easier to adjust and operate.

In accordance with one aspect of the present invention, the motor which drives the burette plunger is a variable speed motor, most preferably a variable speed motor whose speed is a function of the amplitude of a control voltage fed thereto from a motor control circuit designed to operate the motor in only one direction in response to a voltage representing the difference between the output of the pH detecting electrodes and an adjustable voltage source. The control voltage amplitude varies progressively with the difference voltage amplitude. In a recording pH stat, the adjustable voltage source is a manually adjustable source calibrated in accordance with various possible desired pH values of the test solution, such as from 0 to 14.0 in .01 pH steps. A proportional (as distinguished from an on-off) type titration recording apparatus results where very close control over the amount of titration material fed to the test solution is obtained, with the result that the recording equipment follows more accurately and closely the kinetics of the reaction taking place in the test solution.

In accordance with another aspect of the present invention, the motor control circuit of the preferred form of the invention uses, in a modified way, a conventional two directional servo motor phase amplifier circuit which selectively permits a two directional drive of a variable speed motor for calibration purposes, and provides a one directional drive for the motor for normal recording pH stat operation. The conventional circuit is modified by the addition of a switch which disables one half of the amplifier circuit during normal operation, and the addition of a variable impedance device, most advantageously a Zener diode.

Another feature of the invention, which greatly increases the accuracy of the equipment and simplifies the operation thereof, relates to the design of the burette plunger. In a conventional burette, the plunger operates in the manner of a medical syringe plunger where it makes sliding sealing contact with the walls of the burette. In such case, the inside diameter of the burette as well as the plunger should be made to close tolerances, and difficulties are commonly encountered in getting rid of air bubbles in the burette. In the present invention, the plunger is a fed rod made to close tolerances which extends into the burette through a stationary seal in the bottom thereof with which it makes sliding sealing engagement as it moves into the burette. The feed rod is spaced from the walls of the burette a sufficient distance that any air bubbles which may form in the burette between the feed rod and the burette walls can readily rise to the surface of the liquid titration material in the burette, where it can be expunged by simply removing some of the liquid from the top of the burette. Also, in this construction, the volume of the titration material fed from the burette for a given movement of the feed rod has nothing to do with the burette dimensions, but is solely a function of the size of the feed rod. The burette need not, therefore, be made to close tolerances.

In accordance with another aspect of the invention, the temperature of the test solution is controlled directly by a temperature responsive probe having a thermistor or the like therein extending into the test solution and a thermoelectric heat pump mounted beneath the platform which supports the test cell or beaker holding the test solution. The thermoelectric heat pump removes heat from the platform and the test solution thereabove when current flows therethrough in one direction, and feeds heat to the platform and the test solution thereabove when the current flows therethrough in the opposite direction. An adjustable Wheatstone bridge or similar type circuit is provided which responds to the temperature sensed by the temperature responsive probe by feeding current in one direction or the other through the thermoelectric heat pump to maintain a pre-set temperature. All the circuitry and controls for controlling the temperature of the test solution occupies only a small space and thus can readily be combined with the recording pH stat equipment to form an integral, compact portable unit.

The above and other objects, advantages and features of the invention will become apparent upon making reference to the specification to follow, the claims, and the drawings wherein:

Figure 1:
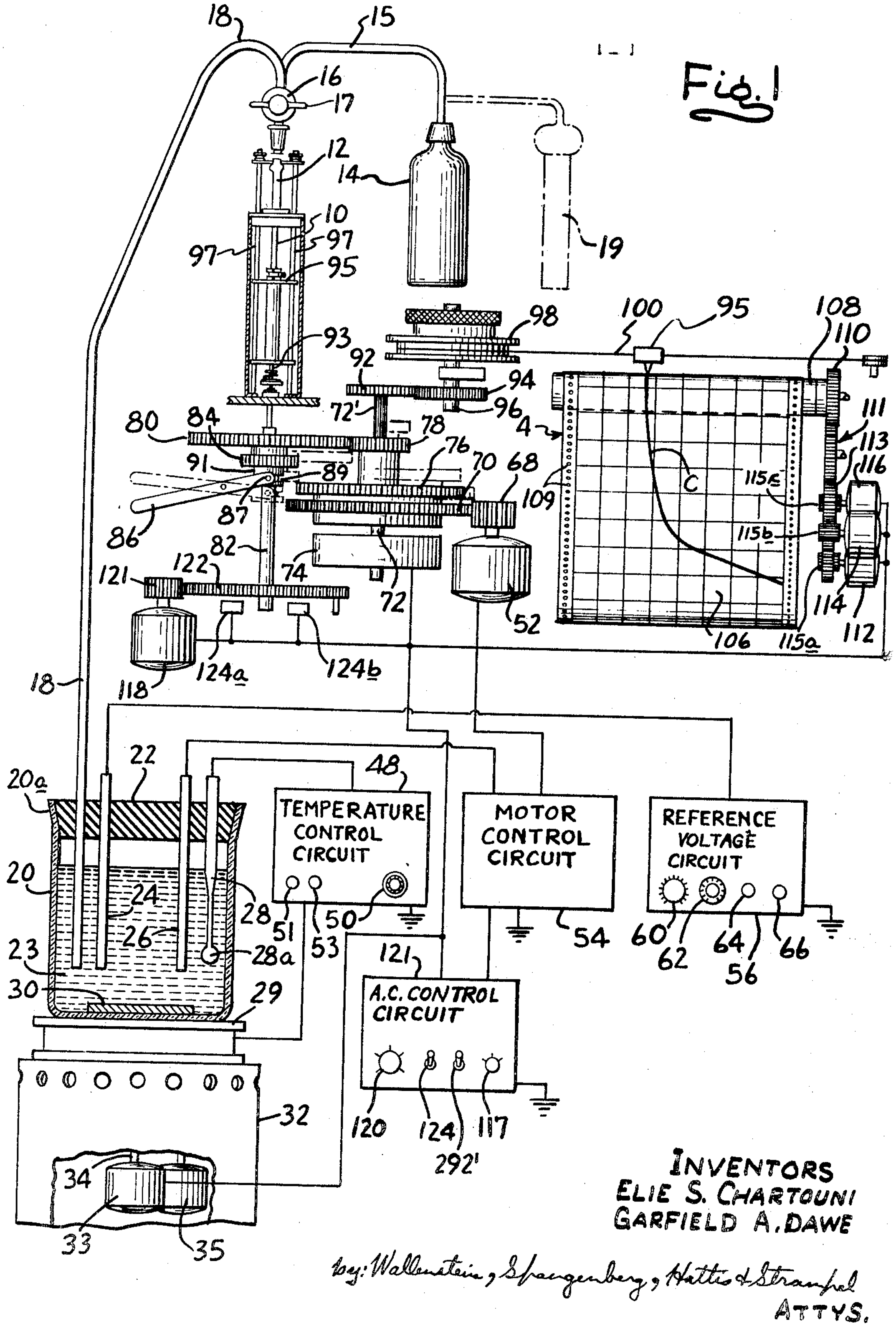
FIG. 1 is a simplified circuit illustrating the various components making up a recording pH stat of the present invention.
Figure 2:
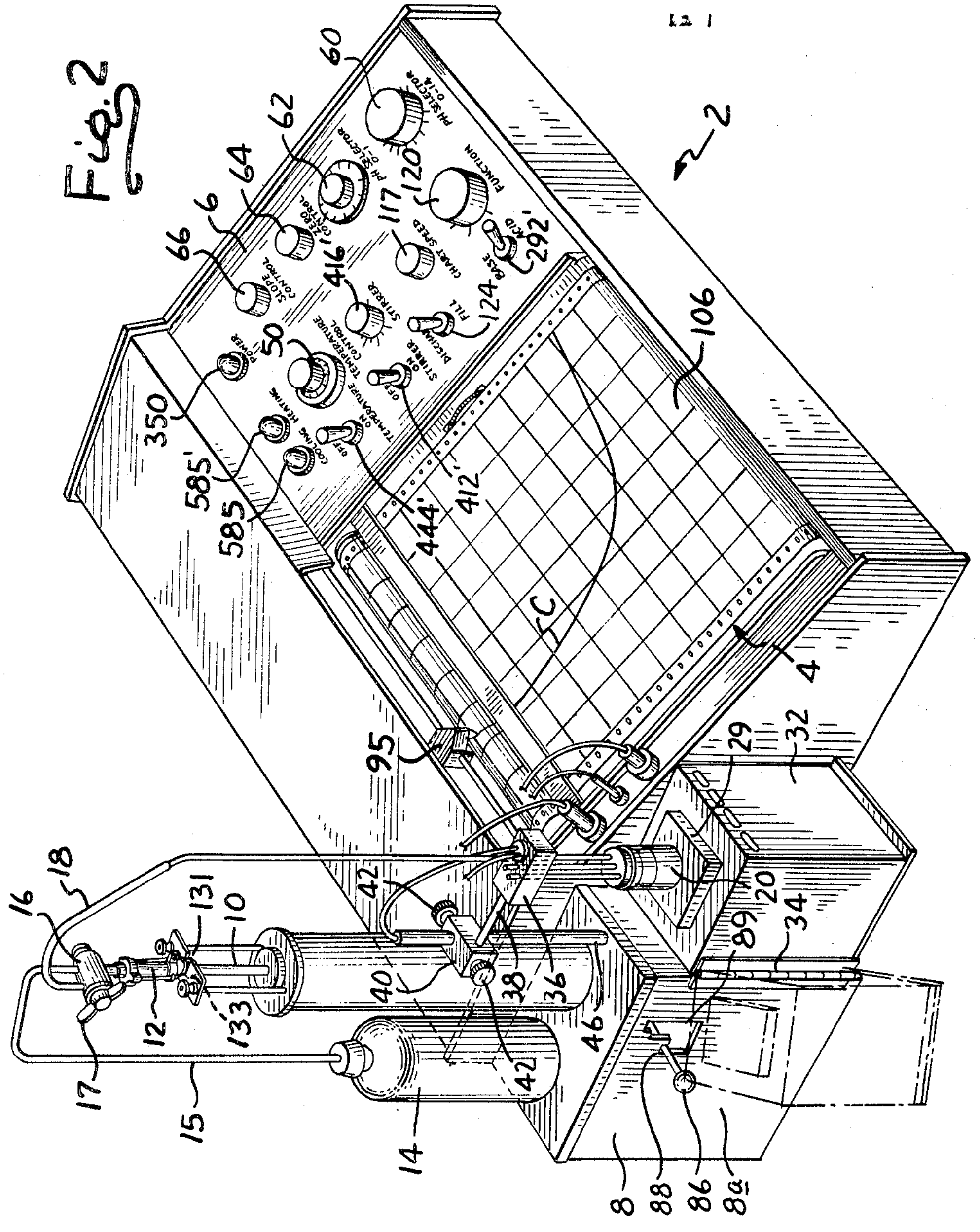
FIG. 2 is a perspective view of a commercial embodiment of the recording pH stat of the present invention.
Figures 3, 5A, 5B:
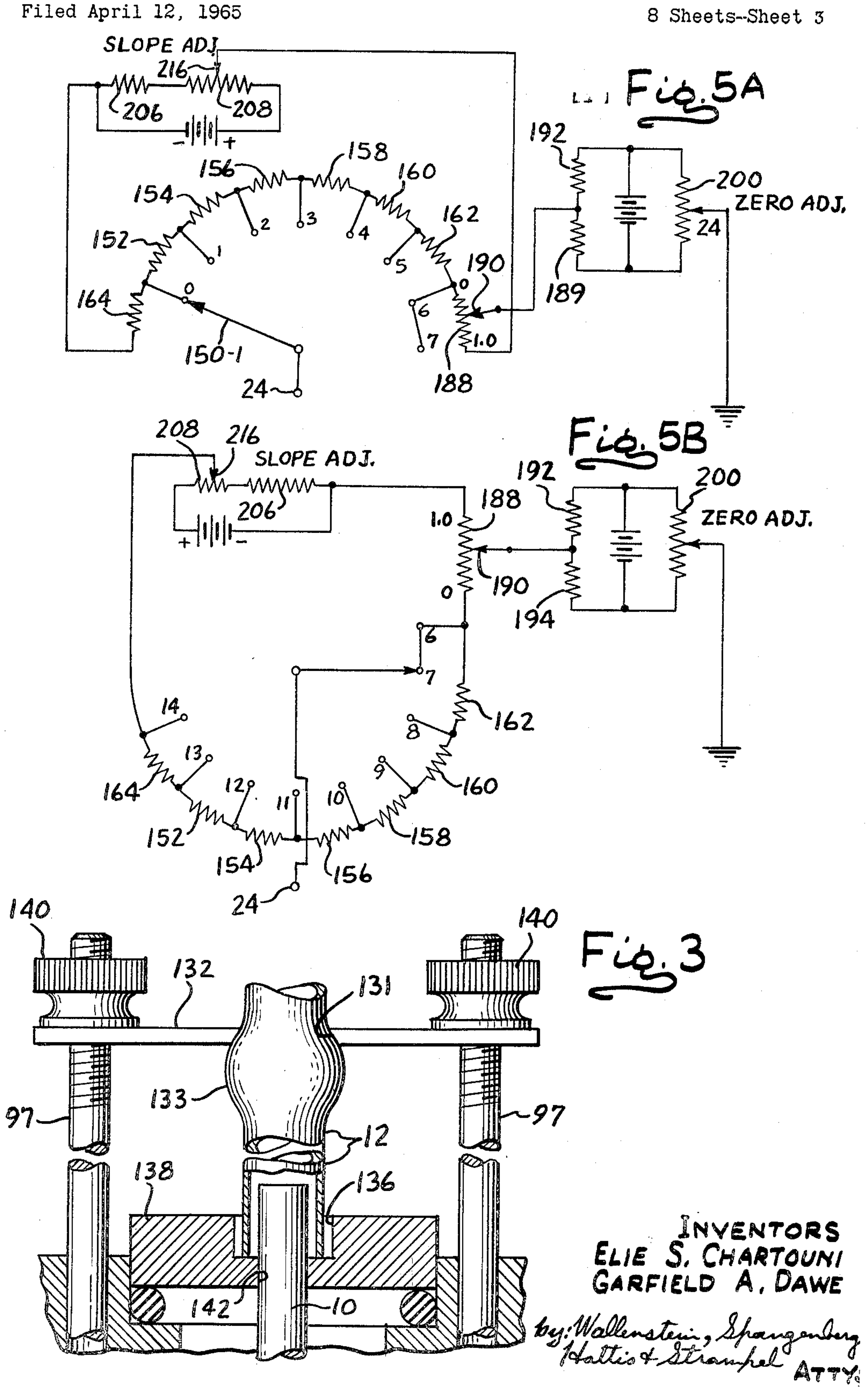
FIG. 3 is a fragmentary enlarged sectional view through the titration material feeding portion of the equipment shown in FIGS. 1 and 2.
Figures 4, 7:
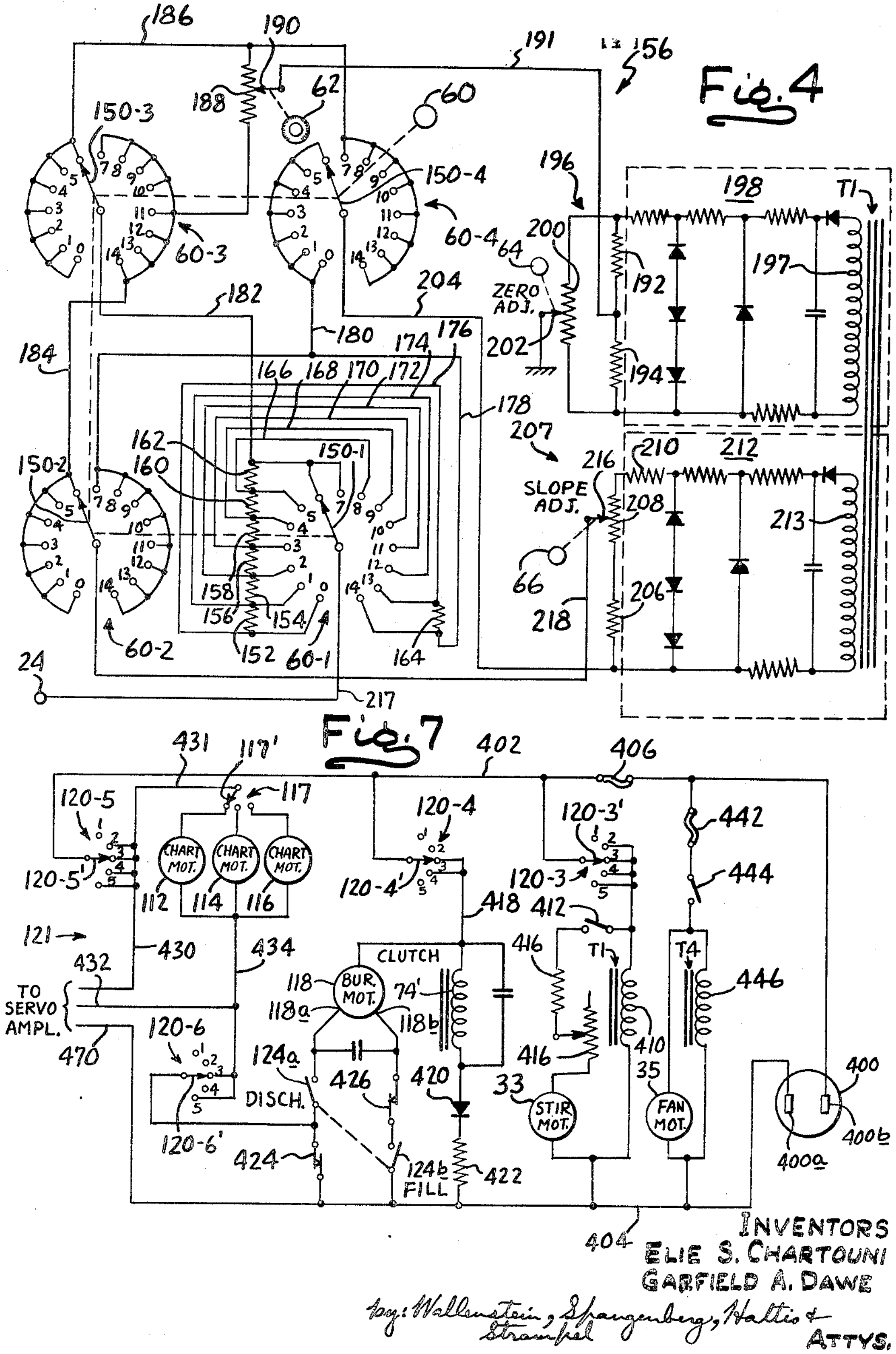
FIG. 4 shows the reference voltage circuit shown in block form in FIG. 1.
Figure 6:
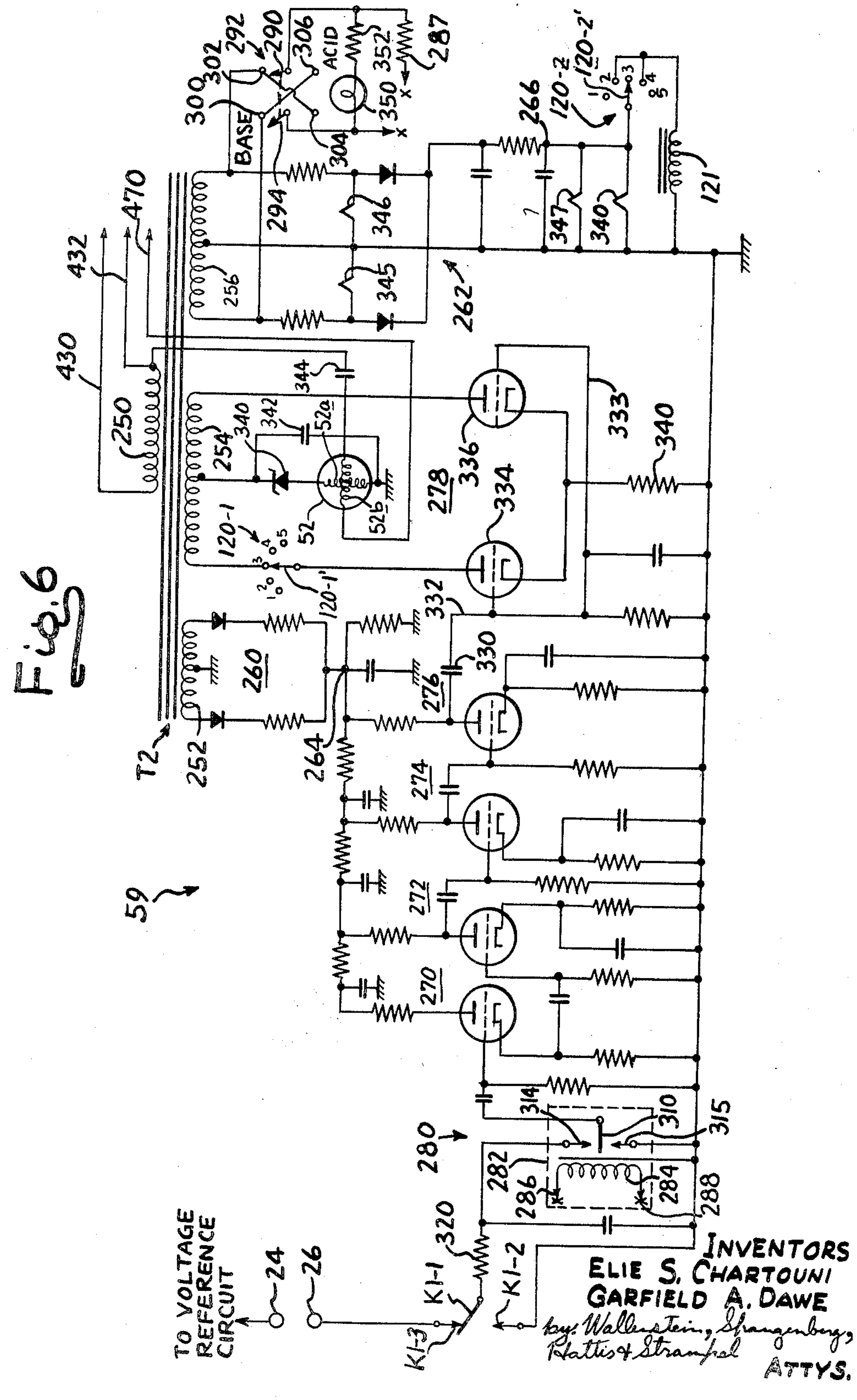
Figure 8:
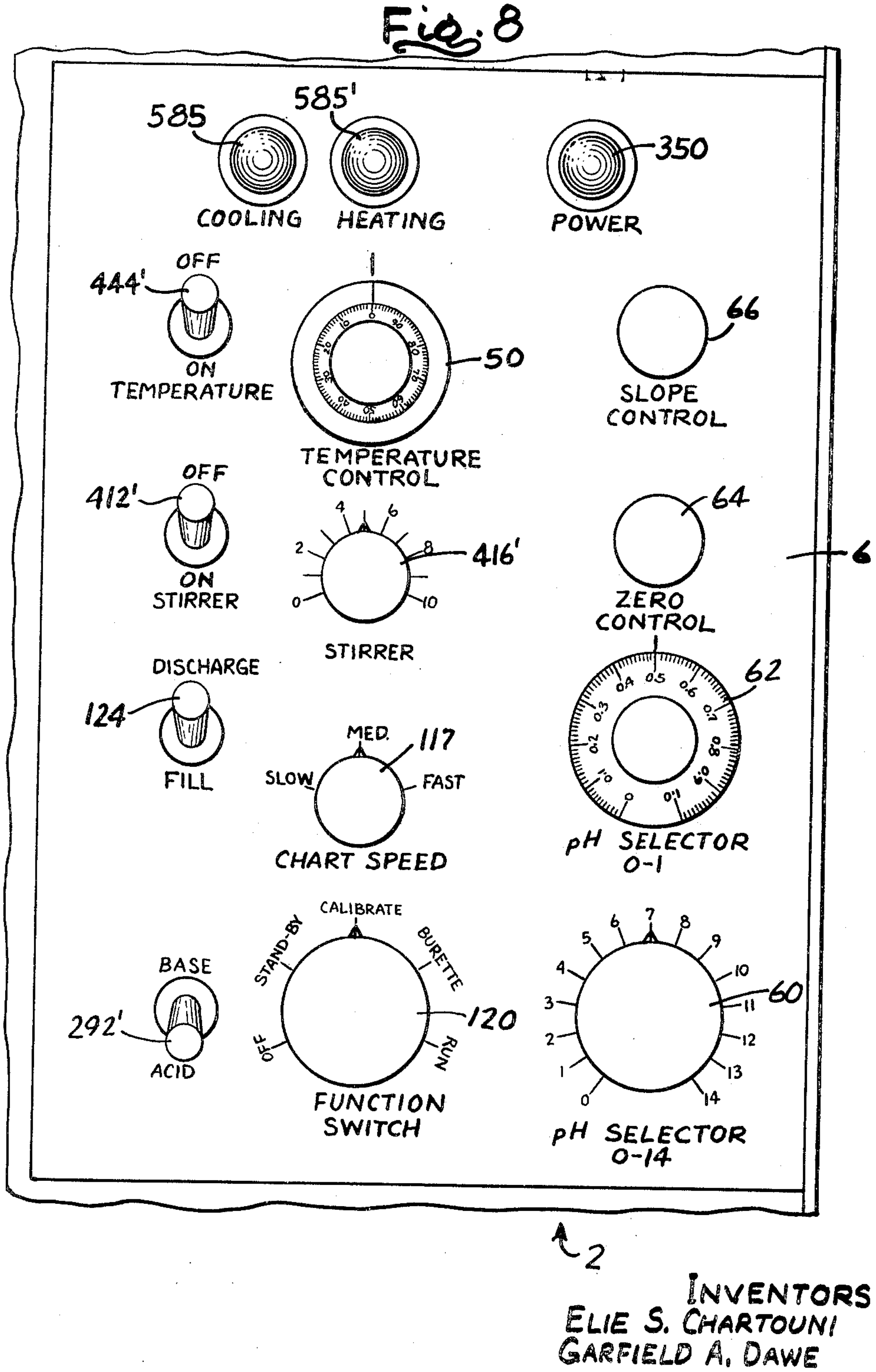
Figure 11:
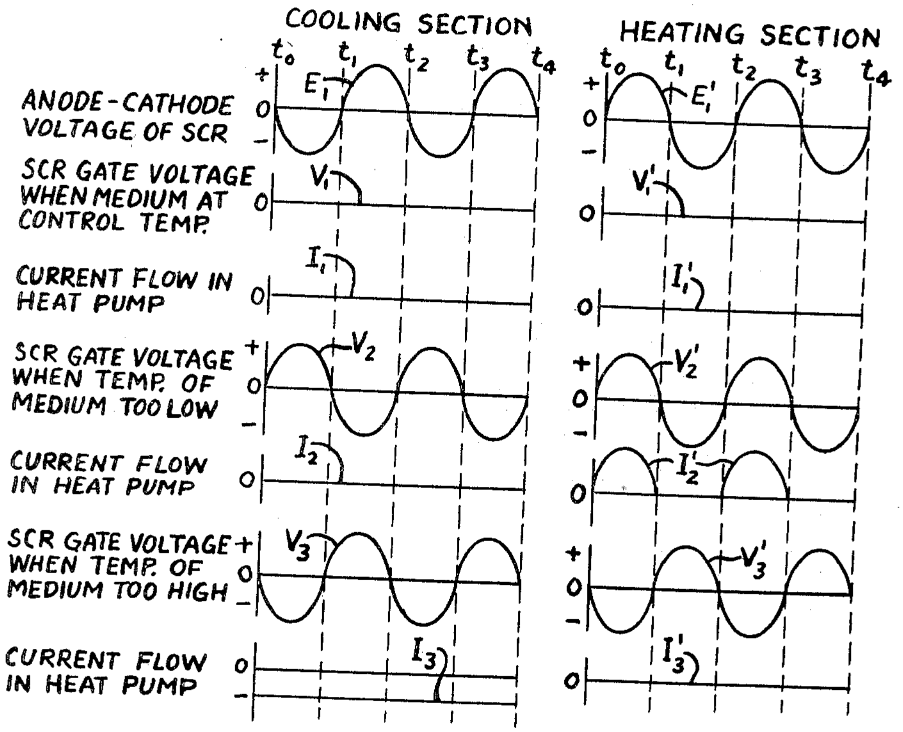
Figure 9:
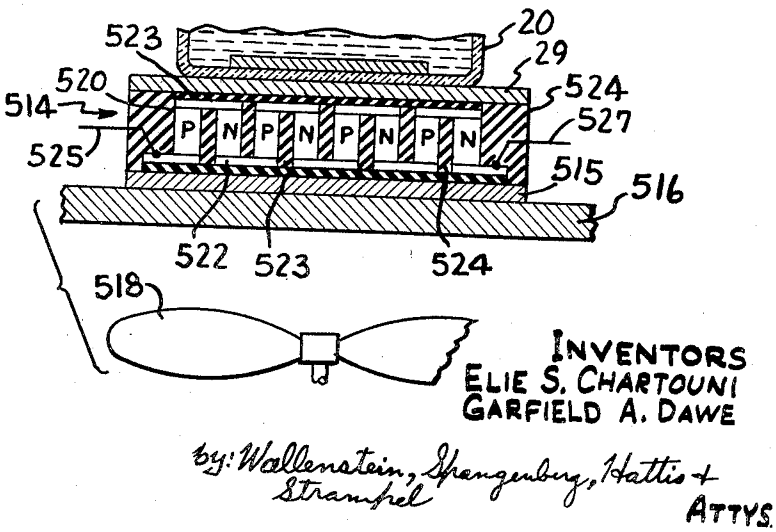
Figure 10:
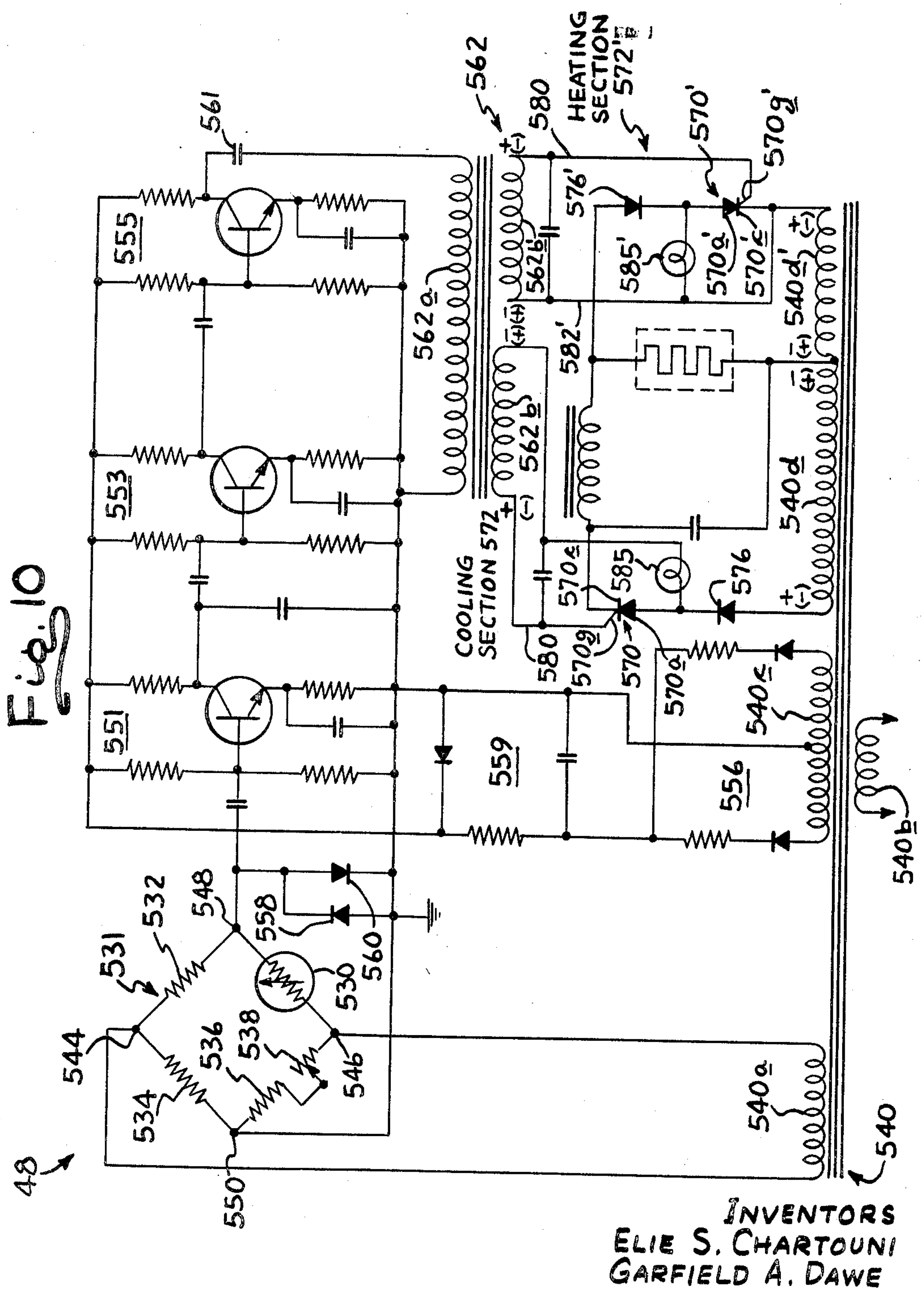

FIGS. 5A and 5B respectively, show the equivalent circuits for the reference voltage circuit shown in FIG. 5 respectively for the pH ranges of zero through 6.9 and 7 through 14;

FIG. 6 is a circuit diagram of the servo motor control circuit shown in block form in FIG. 1;

FIG. 7 shows the A.C. control circuit shown in block form in FIG. 1;

FIG. 8 shows the control panel of the recording pH stat of FIG. 2;

FIG. 9 is a fragmentary sectional view through the beaker support platform and the thermoelectric pump associated therewith used to control the temperature of the test solution;

FIG. 10 is a circuit diagram of the temperature control circuit which controls the flow of current through the thermoelectric pump shown in FIG. 9; and FIG. 11 illustrates various waveforms in the circuit of FIG. 10 for the cooling and heating modes of operation of the circuit.

GENERAL DESCRIPTION (FIGS. 1–2)

The recording pH stat of the present invention illustrated in the drawings has a main housing 2 which contains the various circuit components to be described. A strip chart recorder 4 is exposed on the left hand portion of the housing 2 and a control panel 6 is located on the right hand portion thereof on which are located practically all of the controls for operating the recording pH stat. A burette feed rod drive motor housing 8 extends from the side of the main housing 2. A supply of liquid titration material is contained in a supply bottle 14 resting on the top of the housing 8. The supply bottle 14 is connected through a tube 15 and a three-way valve 16 to the upper portion of a burette 12 in which is mounted a feed rod 10. A feed tube 18 extends from the valve 16 to a beaker or test cell 20 which contains the test solution 23 whose reaction rate is to be recorded on the recorder 4. The valve 16 has a handle 17 which has a first position where only the feed tube 18 communicates with the top of the burette 12, a second position where only the tube 15 communicates with the burette and a third position where tubes 15 and 18 are disconnected from the burette 12.

If desired, a carbon dioxide absorbent material containing tube 19 shown in dashed lines in FIG. 1 may be provided which is connected to the supply bottle 14 for absorbing any carbon dioxide which may be present in the bottle.

The test cell 20 is preferably a flat bottom beaker which has a tapered neck 20*a* which receives a correspondingly shaped cover or plug 22 through which extends the feed tube 18, pH detecting electrodes 24 and 26, and a temperature responsive probe 28 carrying a thermistor or similar temperature responsive element in the head portion 28*a* thereof. Although not illustrated, the plug 22 may also support a thermometer which extends into the test solution. The electrodes 24 and 26 are well known ion exchange units which when extended into a test solution, produce a direct current voltage proportional to the deviation of the pH of the solution from a neutral pH of 7.0, and of a polarity indicating whether the solution is acidic or basic. The electrode 24 is frequently referred to in the art as a reference electrode and the electrode 26 is frequently referred to in the art as a glass electrode.

The beaker 20 rests on a metal platform-forming plate 29 on the top of a fan and stirrer motor housing 32. The housing 32 includes a fan motor 35 and a stirrer motor 33 having a shaft 34 which drives a magnetic element (not shown) which creates a rotating magnetic field which rotates a magnetic bar 30 placed in the bottom of the beaker 20 to effect mixing of the test solution 23. The housing 32 is pivotally mounted by a hinge 34 (FIG. 2) upon the burette feed rod motor housing 8, so that the housing 32 is pivotably in a horizontal plane beneath the beaker 20. The mounting of the housing 32 carrying the platform 29 in this manner greatly facilitates the removal of the beaker 20 from the electrodes 24–26, feed tube 18 and probe 28. Removal of the beaker is thus accomplished by the simple expedient of grasping the beaker 20 with one hand, swinging the housing 32 out of the way and removing the beaker from beneath the electrodes 24–26, feed tube 18 and the probe 28 without disturbing the position of the latter.

The feed tube 18, the electrodes 24 and 26 and the probe 28 pass through and are supported by a block 36 carried on the end of a rod 38 secured for vertical adjustment upon a clamping block 40. Clamping screws 42–42 are provided for locking the clamping block 40 in any selected vertical adjusted position upon a vertical post 46 extending from the housing 8. Once the elevation of the support block 36 has been adjusted to place the electrodes 24 and 26 and the other elements extending into the beaker a safe distance from the bottom of the beaker, the adjustment remains fixed for a given beaker.

A thermoelectric heat pump to be described in detail later on in the specification is associated with the platform 29. It includes solid state elements to be described which, when current flows in one direction therethrough, will result in the removal of heat from the platform 29 and the test solution thereabove, and, when current flows in the opposite direction therethrough, will feed heat to the platform 29 and the test solution thereabove. The desired temperature of the test solution is set by an adjustable control knob 50 on the panel 6, which knob varies an adjustable impedance forming part of a temperature control circuit 48. In a manner to be explained, if the temperature of the test solution sensed by the temperature responsive probe 28 is above the temperature selected by the adjustment of the control knob 50, current is caused to flow in the heat pump in a direction which withdraws heat from the platform 29, and when the temperature of the test solution sensed by the temperature responsive probe 28 is below the temperature set by the control knob 50, current is caused to flow through the heat pump in a direction which will direct heat to the platform 29.

The movement of the feed rod 10 in the burette 12 is controlled by a variable speed servo motor 52 energized from a servo motor control circuit 54. The servo motor control circuit receives a voltage which represents the difference between the voltage output of a reference voltage circuit 56 and the voltage generated by the electrodes 24 and 26. The voltage output of the circuit 56 is determined by the adjustment of a rough pH adjustment control knob 60 and a fine pH adjustment control knob 62 both located on the control panel 6. These control knobs 60 and 62 provide a voltage output which corresponds to the voltage output of the electrodes 24 and 26 for various selected pH values from 0 to 14 in 0.01 pH steps and are thus calibrated in units and hundredths of a pH. As is well known, pH sensing electrodes provide a linear pH voltage curve which varies with the particular temperature of the test solution involved. The reference voltage circuit 56 includes a manual control knob 64 mounted on the control panel 6 which knob is a zero set adjustment control which balances out any small voltage which may be developed by the electrodes 24 and 26 when placed in a completely neutral pH test solution. A manual adjustment control knob 66 is provided on the control panel 6 which control knob serves as a slope adjustment which adjusts the slope of the pH output voltage curve of the circuit 56, so that it corresponds to that of the electrodes 24 and 26.

A voltage which is a measure of the difference between the output of the reference voltage circuit 56 and the voltage of the electrodes 24 and 26 is fed to the motor control circuit 54 which feeds an energizing voltage to the motor 52. In a manner to be explained, during the normal operation of the recording pH stat, the motor control circuit 54 can only drive the motor 52 in a normal forward direction which drives the burette plunger or feed rod upward in the burette 12. During calibration of the equipment, the voltage fed by the motor control circuit 54 can drive the motor 52 in either of two directions depending on the polarity of the difference voltage. In either case, when the outputs of the reference voltage circuit 56 and the electrodes 24 and 26 are equal, the motor control circuit 54 will not deliver energizing voltage to the motor 52.

The motor 52 drives a pinion gear 68 which meshes with a gear 70 carried on a shaft 72 extending from a clutch unit 74. The shaft 72 carries a relatively large gear 76 and a relatively small gear 78. In FIG. 1, the small gear 78 meshes with a large gear 80 carried by a shaft 82 to provide a relatively low speed drive for the shaft 82. The shaft 82 also carries a small gear 84 which, upon a downward movement of the shaft 82, meshes with the aforementioned large gear 76 on the shaft 72 to effect a high speed drive of the shaft 82. The gear arrangement just described permits a fast or slow plunger drive to provide an adjustment of the sensitivity of the recording pH stat.

In FIG. 1, the shaft 82 is axially moved to effect the selective meshing of the gear pairs 78–80 and 76–84 by a pivoted lever 86. The end of its lever 86 is held in a lowered position by a shoulder 88 (FIG. 2) formed by a slot 89 cut in the side wall 8*a* of the housing 8. The lever 86 carries a pin 87 on the inner end thereof which rides in an annular slot 89 of a collar 91 carried by the shaft 82 which permits rotation of the shaft 82 with respect to the pin 87. When the lever 86 is released from the shoulder 88 the outer end of the lever moves upwardly and the shaft 82 drops to bring the small gear 84 on the shaft 82 into engagement with the large gear 76 on the shaft 72.

The rotation of the shaft 82 carrying the gears 84 and 80 rotates a screw 93 threading into a carriage 95 to which the plunger or feed rod 10 is secured. The carriage 95 is vertically slidable upon vertical rods 97—97. As the screw 93 is progressively rotated in one direction, the carriage 95 will progressively rise carrying the plunger or feed rod 10, progressively more further into the burette 12, to displace the titration material therein into the feed tube 18 where it is carried into the test solution. In accordance with a broader aspect of the invention, the plunger or feed rod and the burette can take a variety of forms, but a specific aspect of the invention deals with a unique relationship of the plunger or feed rod and the burette which will be described later on in the specification.

The shaft 72 carrying the drive gears 76 and 78 have an upper portion 72′ carrying a gear 92 which operates to drive the recording head 95 of the recorder 4. To this end, a gear 94 carried on a shaft 96 meshes with the gear 92. A pulley wheel 98 carried on the shaft 96 drives a cord 100 carrying the recording head 95 across a record strip 106. The recording head includes a marking point which marks a line on the strip in the conventional manner. In a recording pH stat the record strip is moved at a constant speed for a given adjustment of the equipment. To this end, a shaft 108 carries sprockets (not shown) with teeth passing into apertures 109 in the record strip 106 to drive the same longitudinally, that is in a direction at right angles to the direction of movement of the recording head 95 thereacross. It is apparent, therefore, that the recording head 95 will trace a curve C on the record strip 106 which at any instant is spaced from a starting point of the curve a distance which indicates the amount of titration material fed into the test solution up to that time. The changes of slope of the curve indicates the variation in reaction rate of the chemical reaction taking place in the test solution.

The shaft 108 carries a gear 110 on the end thereof which is driven by a gear chain 111 including a drive gear 113. The periphery of this drive gear 113 is engaged by spaced pinion gears **115*a*, 115*b* and 115*c* respectively attached to the shafts of synchronous motors 112, 114, and 116 which operate at different speeds. A chart speed selection knob 117 on the control panel 6** selects the motor which is energized in accordance with the desired chart speed.

The clutch unit 74 provides a means for selectively coupling and decoupling the servo motor drive from the burette plunger operating shaft 82. When the clutch unit 74 is energized, the shaft 72 will be moved upwardly to bring the gears 76 and 78 carried thereon out of the path of the gears 80 and 84 on the shaft 82. The gear pairs 68–70 and 92–94, however, remain in engagement during the movement of the shaft 72.

For rapid filling and draining of the burette 12 during set up cleaning of the equipment, the shaft 82 is driven from a reversible motor 118. In such case, the valve 16 is operated to its position where the titrant bottle tube 15 communicates with the burette 12. The motor 118 drives a pinion gear 121 which engages a gear 122 carried on the bottom of the shaft 82. An A.C. control circuit 121 is provided which includes a toggle lever 124 on the control panel 6 which in one position thereof closes a set of contacts **124*a* to energize the motor 118 to drive the same in one direction, and, in another position thereof, closes a set of contacts 124*b* to energize the motor to drive the same in the opposite direction. The lowering of the plunger or feed tube 10 will create a suction which draws titrant from the bottle 14** into the burette.

The various possible modes of the operation of the recording pH stat is controlled by a five-position function switch having a manually operable control knob 120 on the control panel 6. The function switch has a number of switch levels each having a movable contact and five stationary contacts Nos. 1–5 to be referred to in connection with the various circuits shown in the drawings. The five positions of the manual control knob 120 are, in the exemplary form of the invention being described, identified as "off," "standby," "calibrate," "burette," and "run" positions corresponding respectively to the contact positions 1–5 of the switch levels. In the "off" position of the function switch, all of the circuits are de-energized. In the "stand-by" position of the function switch, all of the circuits which are normally energized are energized for warm up. In the "calibrate" and in "burette" positions of the function switch, the clutch unit 74 is energized to decouple the burette plunger drive shaft 82 from the servo motor. Also, in the "calibrate" position, the motor control circuit 54 is adjusted to drive the motor 52 in either of its directions depending upon on whether the output of the reference voltage circuit 56 is greater or less than the voltage across the pH detecting electrodes 24 and 26. In the "run" position of the function switch, the motor control circuit 54 is adjusted to operate the motor 52 in only one direction so that the recording pH stat can operate in the normal manner as previously explained for recording the reaction kinetics of the test solution.

BURETTE CONSTRUCTION (FIG. 3)

Referring now to FIG. 3, there is shown an enlarged sectional view of the burette 12 and the plunger or feed rod 10. The burette 12 illustrated in FIG. 3 passes through an opening 131 in a clamp plate 132 and expands outwardly immediately below the plate to form a protuberant portion 133. The bottom end of the burette 12 rests within a well 136 of a sealing member 138 which forms a seal with the burette at the bottom of the well. The bottom of the burette 12 is forced downwardly into sealing engagement with the sealing member 138 by tightening clamping nuts 140—140 which thread and around the upper ends of the rods 97—97 passing through the clamp plate 132. The clamp plate 132 thereby bears down against the protuberant portion 133 of the burette. The plunger or feed rod 10 passes through an opening 142 in the sealing member 138 and makes a sliding sealing engagement with the defining walls of the opening 142.

The plunger or feed rod 10, which is a very accurately machined cylindrical member, is spaced substantially from the walls of the burette 12 so that an air bubble present in the titrant can freely rise in the burette 12 and be displaced therefrom by moving the plunger or feed rod further into the burette 12 to displace the liquid titrant out of the burette 12 and into the bottle 14 or the feed tube 18. The amount of liquid titrant displaced from the burette 12 is a function solely of the length of the plunger or feed rod 10 which extends into the burette. It is thus apparent that the burette 12 need not be made to any close tolerances, since its dimensions do not affect the volume of the titrant delivered from the burette.

REFERENCE VOLTAGE CIRCUIT 56 (FIGS. 4, 5A AND 5B)

It will be recalled that the voltage across the electrodes 24 and 26 is ideally zero when they are placed in a test solution with the neutral pH of 7.0 and varies progressively in a positive or negative direction as the pH varies in one direction or the other from a pH of 7.0.

The output of the reference voltage circuit 56 provides a voltage output which duplicates the voltage variation of the voltage across the electrodes 24 and 26 for pH values between 0 and 14. To this end, the pH adjustment control knob 60 operates ganged 15-position switches 60–1, 60–2, 60–3, and 60–4. The control knob 60 has 15 calibrated positions identifying pH values of from 0 to 14. Each of these switches includes a movable contact 150–1, 150–2, 150–3, or 150–4 and fifteen station contacts numbered 0 through 14 with which the associated movable contact can make successive engagement. In each of the switches 60–2, 60–3 and 60–4, the No. 0 through No. 6 stationary contacts are interconnected by a common conductor and the No. 7 through No. 14 stationary contacts are interconnected by a common conductor. When the movable contacts of these switches engage any one of the contacts 0 through 6, the equivalent circuit for the reference voltage circuit 56 is shown by FIG. 5A, and when the movable contacts of these switches engage any one of the contacts 7 through 14 the equivalent circuit for the reference voltage circuit 56 is shown by FIG. 5B.

As shown in FIG. 4, identical resistors 152, 154, 156, 158, 160 and 162 are respectively connected between the stationary contact pairs 0–1, 1–2, 2–3, 3–4, 4–5 and 5–6 of the switch 60–1. A resistor 164 of the same value as resistors 152, 164, etc. is connected betwen th No. 13 and No. 14 stationary contacts of the switch 60–1. The No. 8 and No. 7 contacts of the switch 60–1 are interconnected. Conductors 166, 168, 170, 172, 174 and 176 respectively interconnect stationary contacts pairs 8–5, 9–4, 10–3, 11–2, 12–1 and 13–0 of the switch 60–1.

A conductor 178 connects the No. 14 stationary contact of switch 60–1 to the No. 7 through No. 14 contacts of switch 60–2. A conductor 180 interconnects the No. 0 through 6 contacts of switch 60–4 and the conductor 178. A conductor 182 interconnects the No. 6 and No. 7 contacts of the switch 60–1 with the movable contact 150–3 of the switch 60–3. A conductor 184 interconnects the No. 0 through No. 6 contacts of the switch 60–2 with the No. 7 through No. 14 contacts of the switch 60–3. A conductor 186 interconnects the No. 0 through No. 6 contacts of the switch 60–3 to the No. 7 through No. 14 contacts of the switch 60–4.

A fine pH potentiometer 188 having the same value as resistors 152, 154, etc, is connected between the conductor 186 and the No. 7 through No. 14 contacts of the switch 60–3. The wiper 190 of the potentiometer 188 is connected by a conductor 191 to the point of juncture of a pair of resistors 192 and 194 forming part of a zero adjustment circuit 196. The zero adjustment circuit 196 includes a more or less conventional regulated, half wave rectifier D.C. power supply circuit 198 which is connected across the outer ends of resistors 192 and 194. The circuit 198 is energized from the secondary winding 197 of a transformer T1. A zero adjusting potentiometer 200 is connected between the outer ends of the resistors 192 and 194, and the wiper 202 of the potentiometer 200 is connected to ground. Thus, it should be noted that movement of the wiper 202 can adjust the voltage at the wiper 190 of the fine pH adjustment potentiometer 198 to a voltage which is zero (at ground) or a positive or negative voltage. This is necessary so that any voltage which is developed across the electrodes 24 and 26 under neutral pH conditions can be cancelled out by adjustment of the wiper 202 of the zero adjusting potentiometer 200.

The movable contact 150–4 of the switch 60–4 is connected by a conductor 204 to the bottom end of a resistor 206 forming part of a slope adjustment circuit 207. The upper end of resistor 206 is connected to a slope adjusting potentiometer 208. A conventional regulated half wave rectifier D.C. power supply circuit 212 is connected across the outer ends of resistor 206 and potentiometer 208. The power supply circuit 212 is energized from the secondary winding 213 of the transformer T1. The potentiometer 208 has a wiper 216 which is connected by a conductor 218 to the movable contact 150–2 of the switch 60–2. The movable contact 150–1 of switch 60–1 is connected by a conductor 217 to the electrode 24.

Refer now to FIG. 5A which illustrates the equivalent circuit of the reference voltage circuit 56 when the wipers of the switches 60–2, 60–3 and 60–4 engage any of the contacts Nos. 0–6. As there shown, it is apparent that as the movable contact 150–1 of switch 60–1 is moved from the No. 6 contact in succession to the Nos. 5, 4, 3, 2 and 1 contacts that the voltage on the wiper 150–1 will become more and more negative with respect to ground and will progress in definite equal steps. The magnitude of the steps will depend upon the adjustment of the wiper 216 of the slope adjusting potentiometer 208 since this will adjust the direct current voltage applied across the voltage divider circuit formed by the resistors 152–162 and the fine pH adjustment potentiometer 188. The fine pH adjustment potentiometer 188 provides by the movement of the wiper 190 thereof, a progressive small variation in the voltage present on the movable contact 150–1 with respect to ground, which variation represents the voltage variation of the voltage across the electrodes 24 and 26 for a pH variation in a test solution of 1 pH. The control knob 62, which moves the wiper 216 is calibrated in .01 of a pH. Thus, the pH positions 0 to 6.0 of rough pH adjustment control knob 60 produces (when the fine pH adjustment control knob is positioned at the "0" end thereof) negative voltages in steps and duplicating the electrode voltage in solutions having the pH values involved, and subsequent movement of the control knob 62 increases this voltage in smaller steps representing electrode voltage variations in .01 pH step. Since the movable contact 150–1 connects with the electrode 24 (usually referred to as a reference electrode) which is negative with respect to the electrode 26 for pH values of 0 to 6.99 the output voltage of the reference voltage circuit 56 is in opposition to the electrode voltage.

When the movable contacts of the switches 60–1, 60–2, 60–3 and 60–4 are on the No. 7 through No. 15 contacts (see FIG. 5B), the resistors 152, 154, 156, 158, 160 and 162 are respectively positioned between contact pairs 14–13, 13–12, 12–11, 11–10, 0–9, 9–8 and 8–7 of switch 60–1, the resistor 164 is between contact pairs 13–4, and slope control circuit 196 is reversed, so that a progressively increasingly positive voltage is obtained on the movable contact 150–1 of switch 60–1 as it is moved by control knob 60 to the higher numbered pH settings 7.0 to 14. The fine pH adjusting potentiometer 188 will increase progressively this positive voltage as it is moved by control knob 62 toward the "1.0" end thereof. Since the voltage on reference electrode 24 to which movable contact 150–1 is connected is positive with respect to the other electrode 26, the positive voltage on the movable contact 150–1 for pH settings 7.01 to 14 is in opposition to the electrode voltage.

The calibrating procedure of the pH recording stat equipment shown in the drawings is carried out by first placing the function switch 120 on the "calibrate" position, which, as previously indicated, disconnects the motor 52 from the plunger or feed rod drive shaft 82 and operates the motor control circuit 54 into an operating mode where the motor 52 is driven in both directions. Then, a neutral solution is placed in the beaker 20, and, with the rough and fine pH adjustment control knobs 60 and 62 adjusted for a pH value of 7.0, the zero adjustment control knob 64 is moved until the recording head 95 of the recorder is stationary, indicating a perfect balance between the small voltage across the electrodes 24 and 26 and the output of the reference voltage circuit 56. A slope adjustment is then carried out by placing another solution in the beaker 20, which has a known pH substantially different from a neutral pH, adjusting the rough and fine pH control knobs 60 and 62 to the pH of the solution involved, and then rotating the slope control knob 66 until the recording head 95 becomes stationary again.

MOTOR CONTROL CIRCUIT 54 (FIG. 6)

The motor control circuit 54 shown in FIG. 6 is, in many respects, a conventional servomotor control circuit modified in a manner to be explained. As illustrated, the circuit includes a transformer T2 having a primary winding 250 and secondary windings 252, 254 and 256. The transformer secondary windings 252 and 256 respectively form parts of full wave rectifier D.C. power supply circuits 260 and 262 which provide at terminals 264 and 266, respectively, filtered direct current voltages. The terminal 264 is connected to suitable vacuum tube (or transistor) circuits which form respectively a cathode follower stage 270, amplifier stages 272, 274 and 276 and an output phase amplifier circuit 278 which controls the energization of the motor 52 in a manner to be explained.

The input circuit to the cathode follower stage 270 includes a D.C. to A.C. converter circuit 280 which, as illustrated, includes a vibrator 282. The vibrator 282 includes a control winding 284 having an input terminal 286 connected through a resistor 287 to the movable pole or contact 290 of a double-pole double-throw phase reversing switch 292 operated by an acid-base toggle control lever 292′ (FIG. 2) on the control panel 6. The other terminal of the winding 284 is connected to the other movable contact or pole 294 of the switch 292.

The switch 292 has a first pair of stationary contacts 300 and 302 respectively connected to the opposite ends of the secondary windings 262 of the transformer T2. The switch 292 has a second pair of contacts 304 and 306 which respectively are connected to the contacts 300 and 302. In one position of the switch 292, the movable contacts or poles 290 and 294 are respectively connected to the contacts 302 and 300, and in the other position thereof, the movable contacts or poles 290 and 294 are respectively connected to the contacts 306 and 304 which, in turn, are respectively connected to the contacts 300 and 302. Thus, for the two positions of the switch 292, the phase of the voltage applied to the control winding 284 of the vibrator 282 will be 180 degrees out of phase.

The vibrator 282 includes further a movable contact 310 which alternately makes contact between stationary contacts 314 and 315. Whether, in any given cycle, the movable contact 310 makes connection first with the contact 314 or the contact 315 depends upon the phase of the voltage applied to the control winding 284.

The vibrator 282 produces a square wave voltage which has an amplitude equal to the voltage difference between the output of the reference voltage circuit 56 and the voltage across the electrodes 24 and 26, and a phase which depends upon the polarity of this difference and whether the toggle control lever 292′ is in an "acid" or "base" position. The purpose of the switch 292 is to obtain a voltage of the same phase independently of the polarity of the difference voltage referred to, so that the motor 52 will be driven in the same direction independently of whether the test solution is alkaline or acidic. The toggle control lever 292′ is set to its "acid" position when the titrant used is acidic and to its "base" position when the titrant used is basic. It is assumed, of course, that the titrant is a material which, when added to the test solution undergoing a given chemical reaction which would otherwise modify the pH in one direction or another will maintain the particular starting pH.

The stationary contact 315 of the vibrator 280 is connected to ground and the contact 314 thereof is connected to the resistor 320 connected to the movable contact K1–2 of a relay K1. Relay K1 has a stationary contact K1–2 which is connected to ground and a stationary contact K1–3 connected to the electrode 26.

The relay K1 is connected between ground and the No. 2 and No. 4 ("stand-by" and "burette") contacts of the level 120–2 of the function switch. The switch level 120–2 has a movable contact 120–2′ which is connected to the output terminal 266 of the power supply circuit 262, so that the relay K1 will be energized for "stand-by" and "burette" operation of the circuit. When the relay K1 is energized, movable contact K1–1 thereof will be connected to grounded contact K1–2 to disconnect the motor control circuit from an input voltage. When the relay K1 is de-energized, the aforementioned difference voltage will be connected to the vibrator 282.

The square wave voltage fed to the cathode follower stage 270 is amplified in the succeeding amplifier stages 272, 274 and 276. The output of the amplifier stage 276 is coupled through a coupling capacitor 330 and conductors 332 and 333 to the control terminals of a pair of triode amplifier devices 334 and 336 or other suitable amplifier devices, such as transistors. The cathode terminals of the amplifier devices 334 and 336 are connected through a common resistor 340 to ground. The plate terminal of the amplifier device 336 is connected to the right hand end of the winding 259. The plate terminal of the other amplifier device 334 is connected to the movable contact 120–1′ of the switch level 120–1 of the function switch. The No. 3 ("calibrate") contact of the function switch level 120–1 is connected to the left hand of the secondary winding 254. Thus, in the "calibrate" position of the function switch, the plate terminal of the amplifier device 334 will be connected to the left hand end secondary winding 254. In the other positions of the function switch, the latter plate terminal will be unconnected to any voltage source. The phase control circuit is completed by a common load circuit for the amplifier devices 334 and 336 which extends from the center tap of the secondary windings 254 and includes a Zener diode 340 in series with a ground connected motor control winding 52*a* of the motor 52, which is most preferably a variable speed squirrel cage induction motor. The Zener diode 340 is connected in a direction to oppose current flow from the amplifier devices where the voltage drop thereacross is under a given value (such as 12 volts) and will break down for voltages above this value to offer substantially no impedance to current flow. The purpose of the Zener diode will be explained hereinafter.

A capacitor 342 extends between the center tap of the transformer secondary winding 254 and ground. The capacitor 342 preferably forms a resonant circuit with the inductance of the control winding 52*a* at twice the frequency of the applied voltage, namely 120 cycles per second where the transformer T2 is energized from a 60 cycle per second supply. The induction motor has another winding 52*b* connected in series with a phasing capacitor 344 and a source of A.C. voltage of the same frequency as the voltage on the secondary winding 254. As is common in induction motors, the capacitor 344 shifts the phase of the current so that the current flowing in the winding 52*b* is roughly 90 degrees out of phase with the current flowing in the winding 52*a*.

When the function switch is in a "calibrate" position, the phase amplifier circuit 278 operates in the conventional manner (as, for example, explained in U.S. Patent No. 2,423,540 to Wills). In the 60 cycle A.C. circuit, the control voltage fed to the control terminals of the amplifier devices 234 and 236 is a 60 cycle voltage which will be in phase with the plate voltage of one of the amplifier devices 234 or 236 and out of phase with the plate voltage of the other. The amplifier devices will be rendered alternately conductive by the applied plate voltage (if the control voltage at the control terminals so permit) since the plate terminals thereof are connected to opposite ends of the secondary winding 254. When the control voltage fed to the control terminals of the amplifier devices is zero, indicating that the voltage output of the reference voltage circuit 56 and the voltage across the electrodes 24 and 26 are balanced, in the "calibrate" position of the function switch both the amplifier devices 334 and 336 will conduct some during alternate half cycles. In the absence of the Zener diode 340, equal current pulses would be fed to the motor 52 from the amplifier devices which, however, would not affect rotation of the motor 52 for reasons explained in the aforesaid Wills patent. The presence of the Zener diode 340 reduces current flow through the motor to near zero, but this has no significance in the "calibrate" mode of operation. It should be noted in that, although the plate current flowing in the common load circuit from the amplifier devices flows in only one direction, the design of the circuit (including the presence of the capacitor 342) is such that alternating current pulsations will actually flow in the control winding 52*a*.

The control voltage, fed to the control terminals of the amplifier devices 334 and 336 will aid conduction of one of the amplifier devices and hinder conduction of the other of same, resulting in an unbalance of the current pulses fed to the motor 52, which will result in rotation of the motor 52 in a direction depending upon the amplifier device which contributes the larger current pulses.

The Zener diode 340 has significance for the "run" mode of operation of the circuit. It will be recalled that, when the motor 52 controls the movement of the burette plunger or feed rod 10 in the burette 12, it is extremely important that the plunger or feed rod be moved in one direction only to avoid contaminating the titrant. When the amplifier device 334 is disconnected from the amplifier circuit, it should be noted that the circuit inherently becomes an unbalanced circuit so that the aforesaid current flow in the motor winding 52*a* under zero control voltage conditions would, in the absence of the Zener diode 340, cause the motor 52 to creep, which would be a very undesirable situation. This problem is alleviated by the use of the Zener diodes 340 for, in the absence of any control voltage on the control terminal of the amplifier device 336, the plate resistance of the amplifier device 336 is so high that the voltage applied across the Zener diode 340 would not reach the break down level of the same for all or most of the 180 degrees of each half cycle during which the amplifier device 336 can conduct, so the amount of current which passes through the Zener diode during each such half cycle is of insufficient value to cause energization of the motor 52. On the other hand upon the presence of a control voltage on the control terminal of the amplifier device 336 which favors conduction, the average plate resistance of the amplifier device 336 will be lowered to the extent where the voltage applied across the Zener diode will exceed the break down potential thereof for the entire half cycles during which the amplifier device 336 is conductive and so the motor 52 then receives sufficient current to rotate the motor in the only direction it can rotate, namely in the direction where most (here all) of the current originates from the amplifier device 336.

As the control voltage which favors conduction of the amplifier device 336 gradually increases from zero, the speed of the motor 52 will progressively increase preferably reaching a maximum speed when the control voltage represents a pH deviation of a small magnitude, such as .01 or .02 of a pH. (When the acid-base toggle control lever 292' is properly positioned, the phase of the control voltage appearing on the control terminal of the amplifier device 336 originating from the vibrator 280 will always be in the proper direction to aid the current flow through the amplifier 336.)

This proportional speed control is extremely important in providing a fine and accurate control over the amount of titrant fed to the test solution, as indicated in the introductory part of this specification.

As shown in FIG. 6, the power supply circuit 262, in addition to the other functions previously described, connects to the filaments 345, 346, 347 and 348 of the amplifier devices used in the circuits 270, 272, 274, 276 and 278. (Only four filaments are shown because the amplifier devices of circuits 270–272 and 274–276 are contained in common envelopes sharing the same filament circuit.) Also, a power-on light 350 mounted on the control panel 6 is connected in series with a resistor 352 between the movable contacts 294 and 290 of the acid-base switch 292 and so indicates energization of the transformer T2 which occurs during the "calibrate" and "run" positions of the function switch.

A.C. CONTROL CIRCUIT (FIG. 7)

FIG. 7 illustrates the A.C. control circuit 121. The input to this circuit is a source of 60 cycle per second alternating current voltage fed thereto by a suitable connector 400. The connector 400 has a pair of terminals **400*a* and 400*b* which extend to buses 402 and 404. A fuse 406 is placed in the connection between the terminal 400*b* and the bus 402**.

A branch extends between the buses 402 and 404 including the level 120–3 of the function switch whose movable contact 120–3' in all positions but the "off" position thereof is connected to the bus 404 through a parallel circuit including the primary winding 410 of transformer T1 of the reference voltage circuit 56 constituting one section of this parallel circuit. The other section of the parallel circuit includes a stirring motor on-off switch 412 having a toggle control lever 412' on the control panel 406, resistor 414, a stirring speed adjusting rheostat 416 having a control knob 416' on the control panel 6 and the stirring motor 33.

Another branch extends between the buses 402 and 404 including a level 120–4 of the function switch whose movable contact 120–4' is connected to bus 402 and whose No. 3 and No. 4 ("calibrate" and "burette") contacts are connected to a conductor 418 extending to one terminal of the burette plunger drive motor 118 and a solenoid 74' of the clutch unit 74. The clutch solenoid 74' is connected through a rectifier 420 and a resistor 422 to the bus 404. The burette motor 118 has a terminal **118*a* which, when connected to the common bus 404, will effect rotation of the motor 118 in a direction which moves the plunger or feed rod operating carriage 95 upward, and a terminal 118*b* which, when connected to the common bus 404, will effect rotation of the motor 118 in the other direction to move the carriage 95 downward. The terminal 118*a* is connected to a set of contacts 124*a* of a discharge-fill switch having a toggle control lever 124 on the control panel 6 which contacts are closed when the lever is in the "discharge" position and are open when the control lever 124 is in the "fill" position. The contacts 124*a* are connected to an upper limit switch 424 which is normally closed and which is opened when the plunger or feed rod operating carriage 95 reaches the uppermost desired position of its path of travel. This limit switch can be a suitable switch (not shown in FIGS. 1–3) which is operated by the movement of the carriage 95** to its uppermost position.

The terminal **118*b* of the motor 118 is connected to a bottom limit switch 426 which is normally closed and which is opened when the carriage 95 reaches a bottommost desired position. The limit switch 426 is connected to a set of contacts 124*b* of the discharge-fill switch which are closed when the lever 124** is in its "fill" position.

Still another branch circuit extends between the buses 402 and 404 including a level 120–5 of the function switch. The movable contact 120–5' thereof is connected to the bus 402 and the No. 2 through No. 5 contacts of this switch level are connected to a conductor 430 extending to the left hand end (see FIG. 6) of the primary winding 250 of the transformer T2 forming part of the motor control circuit 54. The right hand end of the primary winding 250 is connected by conductor 432 to a conductor 434 extending to the No. 3 and No. 5 "calibrate" and "run" contacts of a level 120–6 of the function switch. The movable contact 120–6' of the switch level 120–6 extends to the juncture between the upper limit switch 424 and the contacts **124*a*. It is thus apparent that the motor control circuit 54 is energized in the "calibrate" and "run" positions of the function switch as long as the plunger or feed rod 10 does not reach the uppermost limit of travel thereof. At the upper limit thereof, the upper limit switch 424 is opened to de-energize the motor control circuit 54**.

The energizing circuit for the chart drives motors 112, 114 and 116 includes a conductor 431 which extends from the No. 2 to No. 5 contacts of the level 120–5 of the function switch to the movable contact 117' of a chart speed switch. The later switch has three stationary contacts which are respectively connected to one of the terminals of the chart drive motors 112, 114 and 116 whose opposite terminals are connected to the conductor 434 leading to the No. 3 and No. 4 terminal of the function switch level 120–6'. It is apparent that the particular chart drive motor to be energized is selected by moving the movable contact 117' to the appropriate contact position during "calibrate" or "run" operation of the circuit.

The A.C. control circuit of FIG. 7 has a conductor 440 which extends from the bus 404 to the left hand end of the control winding **52*b* of the induction motor 52** shown in FIG. 6.

The circuit of FIG. 7 also includes a branch circuit which operates the temperature control circuit 48 to be described. This branch circuit includes a fuse 442, a temperature control on-off switch 444 which has a control knob 444' on the control panel 6, the switch 444 being closed when the knob 444' is moved to the "on" position, and a parallel circuit including a primary winding 446 of a transformer T4 forming part of the temperature control circuit and the aforementioned fan motor 35.

TEMPERATURE CONTROL CIRCUIT (FIGS. 9 THROUGH 11)

As best shown in FIG. 9, the upper metal wall 516 of the motor housing 32 forms a heat sink-forming wall against the bottom of which is directed a stream of air by a fan blade 518 driven by aforementioned motor 33. The heat pump, generally indicated by reference numeral 514, is mounted on the wall 516. The heat pump includes a bottom metal plate 515 which rests upon the housing wall 516. The blowing of air against the wall 516 fixes the temperature of the wall and the plate 515 above it at approximately room temperature.

The operating characteristics of the illustrated heat pump 514 are determined principally by a series of semiconductor elements 520 of the P and N type. These semiconductor elements, for example, may be made of bismuth telluride ($Bi_2Te_3$) with the P type elements doped with an excess of bismuth and the N type elements dopes with silver iodide. These semiconductor elements 520, which are distributed over substantially the entire area occupied by the heat pump, may be connected in series circuit relation as illustrated by suitable conductive links or terminals 522 extending between the adjacent upper and lower surfaces of adjacent semiconductor elements so that the control paths extend upwardly and downwardly through the various semiconductor elements. The terminals 522 are electrically insulated from the adjacent metal parts by suitable layers 523—523 of insulating cement. Spaces between the platform 29 and plate 515 are filled by a suitable potting compound 524. Conductors 525 and 527 extend from and connected the series connected semiconductor elements to the aforementioned control circuit.

As previously indicated when current flows in one direction through the semiconductor elements 520, the heat is delivered to the platform 29 to heat the beaker 20 and when current flows in the opposite direction through the semiconductor elements 520 heat is withdrawn from the platform 29 to cool the beaker.

Refer now to FIG. 10 which shows a preferred form of control circuit for controlling the flow of current through the heat pump 514 to maintain the liquid in the beaker at a given control temperature. The temperature responsive impedance element illustrated therein is a thermistor 530 which is mounted in the head of the probe 28 and has a negative temperature coefficient. As illustrated, the thermistor 530 is connected into a Wheatstone type bridge circuit 531 where the thermistor 530 forms one of the arms of the bridge circuit, resistors 532 and 534 forms two other arms of the bridge circuit, and a fixed resistor 536 connected in series with a variable resistance element 538 forms the fourth arm of the bridge circuit. The variable resistance element 538 would normally be a manually variable element where the control temperature for a given situation is to be set at one of a number of possible values. However, it could be an automatically controlled element which varies the control temperature in accordance with any desired temperature control program.

In the most advantageous form of the present invention, the input of the bridge circuit is energized from the secondary winding 540*a* of a power transformer T4. The Wheatstone bridge circuit 531 has input terminals 544 and 546 located at a pair of diagonally opposite points of the bridge circuit and output terminals 548 and 550 located at the other pair of diagonally opposite terminals of the bridge circuit.

The temperature of the liquid in the beaker 20 is determined by the adjustment of the variable resistance element 538 which determines the temperature at which the bridge will be in balance where there will be no output voltage across the output terminals 548 and 550. When the temperature of the liquid in the beaker is above the selected value, the thermistor resistance will have a value which unbalances the bridge circuit in one direction where voltage across the output terminals 548 and 550 will have a sinusoidal waveform of a first phase which will be either in phase or 180 degrees out of phase with the voltage input to the bridge circuit. When the temperature of the liquid in the beaker is below the selected value, the bridge will be unbalanced in the opposite direction where the voltage across the output terminals 548 and 550 of the bridge circuit will be of opposite phase to the output voltage under the first mentioned unbalanced condition. This phase changing characteristic of the A.C. bridge circuit is taken advantage of in the preferred form of the present circuit by controlling the direction of flow of current through the heat pump in accordance with the phase of the output voltage of the bridge circuit.

In the particular preferred circuit shown in FIG. 10, the output of the bridge circuit is fed to a series of NPN transistor amplifier stages respectively identified by reference numerals 551, 553 and 555. The amplifier stages 551, 553 and 555 obtain operating D.C. voltage from a conventional full wave rectifier circuit 556 and filter circuit 559 energized from a secondary winding 540*c* of the power transformer T4.

The circuitry of the amplifiers stages forms no part of the present invention. Any one of a number of well known amplifier circuits could be used and so a detailed description thereof will not be given. However, it should be noted that, in the preferred circuit illustrated, a pair of reverse, parallel connected clipper rectifiers 558 and 560 are connected across the input of the first amplifier stages 551. If these rectifiers are silicon rectifiers, they will become conductive in the range of from about .5 to .7 volts and thus prevent overdriving of the amplifier transistors and the circuit coupled thereto.

The output of the last output transistor stage 555 is coupled through a suitable coupling capacitor 561 to one end of the primary winding 562*a* of a control transformer 562. The opposite end of the winding 562*a* is connected to ground (as is output terminal 550 of the bridge circuit 531 and the amplifier stages 551, 553 and 555). The amplifier stages 551, 553 and 555 are preferably designed to provide negligible phase shift so that the voltages appearing across the windings of the control transformer 562 are either in phase or 180 degrees out of phase with the output of the bridge circuit 531.

The control transformer 562 has a pair of secondary windings 562*b* and 562*b'* which control the firing of a pair of SCR devices 570 and 570' forming part of a rectifier control circuit 571.

The rectifier control circuit 571 has a cooling section 572 and a heating section 572'. The heat pump 514 is connected in common between these two sections which form respective loop current paths through which current can respectively flow only in different directions through the heat pump. Thus, the heating section 572' includes a branch connected across the heat pump which branch includes in series circuit relation a voltage-dropping rectifier 576' connected to the upper end of the heat pump and arranged to pass conventional current flow in the downward direction as viewed in FIG. 10, the anode and cathode terminals 570*a'* and 570*c'* of the SCR device 570' which passes current in the same direction as the rectifier 576', and a section 540*d'* of the secondary of the power transformer 540 connected to the bottom end of the heat pump 14. Thus, when rectifiers 576 and SCR device 570' are conductive, current will flow through the heat pump 514 in an upward direction as viewed in FIG. 10 which is the direction which will effect heating of the liquid in the beaker 20.

When the right end of the secondary section 540' of the power transformer 540 connected to the cathode electrode 570' of the SCR device 570' is negative with respect to the other end thereof, the SCR device 570' will be prepared for firing when a positive voltage is fed to the gate or control electrode 570*g'* thereof. As will appear, the voltage on the gate electrode 570*g'* of the SCR device 570' will be positive while the device is prepared for firing only when heating is called for. If the voltage fed to the gate electrode 570*g'* is negative at the instant that the device is prepared for conduction, the device will not fire. The SCR devices 570 and 570' act like conventional thyration tubes which, after firing, continues to conduct until the current flow is interrupted or drops to a point near zero.

The control circuit for the SCR device 570' includes a conductor 580' connecting one end of the secondary winding 562*b'* of the control transformer 562 to the gate electrode 570*g'* and a conductor 82' connecting the other end of the secondary winding **562*b*′ to the cathode electrode 570*c*′ of the SCR device 570′**.

The cooling section 572 of the rectifier control circuit 571 includes a filter choke 575 connected to the upper end of the heat pump 514, the cathode and anode electrodes **570*c* and 570*a* of the SCR device 570 arranged to pass current in the upward direction as viewed in FIG. 10, a voltage dropping rectifier 576 arranged to pass current in the same direction as the SCR device 570, and a section 540*d* of the secondary of the power transformer 540, connected to the bottom end of the heat pump 514. Thus, the conduction of the rectifiers 570 and 576 will result in the flow of current through the heat pump 514 in a downward direction as viewed in FIG. 10, which is the direction which will effect cooling of the liquid in the beaker 20**.

The secondary winding sections **540*d* and 540*d*′ are arranged so that, at any given instant, the voltage at the outer ends of these sections (i.e. the points remote from the heat pump 514) have the same polarity relative to the inner ends thereof connected to the heat pump 514. It should also be noted that the cooling and heating sections of the rectifier control circuit 571 are connected in an opposite relationship to the outer ends of the transformer secondary winding sections 540*d* and 540*d*′ so that, when the rectifiers of the cooling section 572 are prepared for conduction (due to the connection of the positive side of the secondary winding section 540*d* to the anode side of the rectifiers), the rectifiers in the heating section will not be prepared for conduction (due to the connection of the then positive side of the secondary winding sections 540*d*′** to the cathode electrode side thereof) and visa-versa. Thus, the rectifiers in the cooling and heating sections are prepared for conduction during different alternate half cycles.

The voltage appearing across the secondary winding **562*b* of the control transformer 562 controls the conduction of the SCR device 570 when the same is prepared for conduction. To this end, a conductor 580 extends from the left end of the secondary winding 562*b* to the gate electrode 570*g* of the SCR device 570, and a conductor 582 connects the other end of the secondary winding 562*b* to the cathode electrode 570*c* of the SCR device 570. The conductors 580 and 580′ which respectively connect the winding 562*b* and 562*b*′ to the gate electrodes 570*g* and 570*g*′ of the SCR devices 570 and 570′ are always in phase with one another as indicated by the waveforms V2 and V2′ and V3 and V3′** in FIG. 11.

When the temperature of the liquid in the beaker 20 is at the selected value, the output of the bridge circuit 531 will be zero as will the voltage appearing across the secondary windings **562*b* and 562*b*′ of the control transformer 562, as is illustrated by waveforms V1 and V1′ in FIG. 11. In such case, there will be no current flow in the SCR devices 570 and 570′ or the heat pump 514. When the temperature of the liquid in the beaker 20 is below the selected value, the resulting unbalanced condition of the bridge circuit will produce in phase voltages V2 and V2′ in the secondary windings 562*b* and 562*b*′ of the control transformer 562 whose amplitude is proportional to the degree of unbalance of the bridge circuit. These voltages are applied to the gate electrodes 570*g* and 570*g*′ of the SCR devices 570 and 570′**.

The voltage waveforms E1 and E1′ in FIG. 11 represent respectively the voltages applied across the cathode and anode electrodes of the SCR devices 570 and 570′. The SCR devices are prepared for conduction only during the positive going portions of the anode-cathode voltage waveforms E1 and E1′. It will be noted that the positive going portions of the anode-cathode voltage waveform E1′ and the gate voltage waveforms V2′ applied to the SCR devices 570′ occur simultaneously during the first and third half cycles, that is between the intervals *t*0 and *t*1, and *t*2 and *t*3, thereby causing firing of the SCR device 570 during these intervals to produce positive pulses of current (i.e. upward flow of current) through the heat pump 14, as indicated by current waveform I2′, in FIG. 11. The actual point in each such half cycle interval during which firing of the SCR device 570′ takes place will vary between the 0 and 90 degree points therein. The greater the amplitude of the gate voltage, the closer to zero degrees in the half cycle involved will be the firing time and the larger will be the conduction time, of the SCR device. This characteristic of the circuit minimizes hunting or overshooting in the temperature control operation, resulting in a finer temperature control.

When the anode-cathode voltage waveform V2 applied to the SCR device 570 in the cooling section is positive, the voltage applied to the gate electrode **470*g* thereof is negative and vice versa, so that the SCR device 570** cannot fire when heating is called for.

When cooling is called for, the phase of the voltage in the secondary windings **562*b* and 562*b*′ of the control transformer 562 will reverse so that the gate voltage applied to the gate electrodes 570*g* and 570*g*′ of the SCR devices 570 and 570′ will follow the waveforms V3 and V3′** in FIG. 11. In such case, it will be noted that, during the second and fourth half cycles, that is between the intervals between *t*1 and *t*2, and *t*3 and *t*4, the anod-cathode voltages and the gate voltages applied to the SCR device 570 will be positive going, thereby causing the firing of the SCR device 570 at a point determined by the amplitude of the gate voltage V3 and the flow of negative current (i.e. downward flow of current) through the heat pump 514 as indicated by waveform 13 in FIG. 11. Note that the waveform I3 is not a pulsing current as in the case of the current flow I3′ in the heating section of the rectifier circuit, but rather is substantially steady current. This steady current condition is obtained by the choke 575 and a filter capacitor 583 connected between the left end of the choke 575 as viewed in FIG. 10 and the bottom of the heat pump 514.

The reasons why current pulsations are minimized in the cooling section is that it has been discovered that the pulsation of current flowing in the cooling direction through the heat pump 514 results in a decrease in the cooling effect produced by the heat pump relative to the case where a steady direct current flow therethrough. On the other hand, when a pulsating current is fed through the heat pump 514 in the heating driection, the pulsating nature of the current produces an increased heating effect, hence the absence of a filter in the heating section 572′ of the control rectifier circuit.

It is often desirable to know whether the heat pump is in a heating or cooling mode of operation. To this end, a heating mode indicating lamp 585 which may be a red colored lamp, is connected between the anode and cathode electrodes of the SCR device 570 in the cooling section of the control rectifier circuit. When the SCR device 570 is conducting, the anode to cathode voltage of the SCR device is low so that there is relatively little current flow through the lamp 585 which will then appear dark. On the other hand, when the SCR device 570 is in a nonconductive condition, indicating that the heating section rather than the cooling section is operating, the voltage across the anode to cathode electrodes of the SCR device 570 will be sufficiently high to effect energization of the lamp 585.

A cooling mode indicating a lamp 585, which may be a blue lamp, is connected between the anode and cathode electrodes of the SCR device 570′ in the heating section of the rectifier circuit so that the lamp will be energized only when the cooling section 572 is operating.

The present invention thus provides a very reliable, easy to operate, accurate and compact recording pH stat.

It should be understood that numerous modifications may be made to the preferred form of the invention described above without deviating from the broader aspects thereof.

We claim:

1. In a titration apparatus including pH detecting electrodes insertable into a test solution where pH tends to vary in a given direction and providing a direct current voltage of a magnitude which is a measure of the degree of acidity or alkalinity of the test solution and a polarity which indicates whether the solution is acidic or alkaline, an adjustable calibrated reference voltage source for presetting a voltage output representing an output of said electrodes at any one of various pH values on opposite sides of a neutral pH, and recording means for recording the amount of titration material fed to said test solution with time, the improvement in means for feeding controlled amounts of the titration material to the test solution comprising: feeding means for delivering titrant progressively to said test solution, which titrant opposes said variation in pH, and means responsive to the difference between the output of the electrodes and the preset output of the adjustable voltage source for operating said feeding means to deliver titrant to said test solution at a speed which is zero when the difference between said voltages is zero and increases with the difference between said voltages.

2. In a titration apparatus including pH detecting electrodes insertable into a test solution whose pH tends to vary in a given direction and providing a direct current voltage of a magnitude which is a measure of the degree of acidity or alkalinity of the test solution and a polarity which indicates whether solution is acidic or alkaline, an adjustable calibrated reference voltage source for presetting a voltage output representing an output of said electrodes at any one of various pH values on opposite sides of a neutral pH, a burette for holding a supply of liquid titration material, and recording means for recording the amount of titration material fed to said test solution with time, the improvement in means for feeding controlled amounts of the titration material to the test solution comprising: a liquid displacing rod extending into the bottom of said burette through a stationary seal, said rod being spaced from the walls of said burette by an amount greater than the largest expected dimensions of the air bubbles, so that any air bubbles present between the rod and the burette walls will readily rise to the top of the burette, a feed conduit extending between the upper portion of said burette and said test solution for delivering titrant displaced from said burette to said test solution, which titrant opposes said variation in pH, and means responsive to a difference between the output of the electrodes and the output of the adjustable voltage source for moving said rod in only one direction into said burette to displace titrant from said burette into said feed conduit solely in accordance with the volume of the rod moved into the burette and at a speed which is zero when the difference between said voltages is zero and inceases with the difference between said voltages.

3. In a titration recording apparatus responsive to pH variations in a test solution where pH is to vary in a given direction, said titration recording apparatus including: pH detecting electrodes insertable into said test solution and providing a voltage of a magnitude which is a measure of the degree of acidity or alkalinity of the test solution, an adjustable calibrated reference voltage source for setting a voltage output representing the output of said electrodes at any one of various pH values on opposite sides of a neutral pH, a voltage comparison circuit providing a voltage output which is a measure of the difference between the electrode voltage and the output of said adjustable reference voltage source, a supply of liquid titration material which material opposes said variation in pH, and recording means for recording the amount of titration material added to said test solution, the improvement in means for controlling the feeding of said titration material to said test solution and operating said recording means to indicate the amount of titration material fed to said test solution comprising: a container for holding said supply of titration material, a feed conduit connecting said container to said test solution, a liquid displacing feed element movable in said container to displace said titration material from said container into said feed conduit where it is delivered to said test solution, variable speed motor means for simultaneously progressively moving said feed element into said container in only one direction and operating said recording means to record the value of titration material displaced from said container into said test solution in response to the feeding of energizing voltage thereto, said motor means having a speed characteristic which varies progressively from zero to a given value with the variation in the amplitude of the energizing voltage fed thereto from a given minimum value to a given value, and motor control means responsive to the voltage output of said voltage comparison circuit by feeding energizing voltage to said motor means to drive the same in only one direction which moves said feed element further into said container and which has an amplitude which is said minimum value when the output of said voltage comparison circuit is zero and increases with the increase of said output from said minimum value.

4. The titration recording apparatus of claim 3 wherein said motor control means operates said motor means in only one direction in response to an output voltage from said voltage comparison circuit of one polarity and render the motor means inoperative in response to an output voltage of said voltage comparison circuit which is zero or a polarity opposite to said one polarity, and said adjustable reference voltage source, pH detecting electrodes and said voltage comparison circuit providing direct current voltages having the magnitudes referred to.

5. The titration recording apparatus of claim 4 wherein said means responsive to the output of said voltage comparison circuit is a voltage converter circuit which converts the direct current output voltage of the comparison circuit to a square wave voltage whose amplitude is a function of the amplitude of said direct current output voltage, and having a phase which is a function of the polarity of the output of the voltage comparison circuit, and switch means for selectively reversing the phase of the output voltage of said voltage converter circuit from that normally obtained therefrom, wherein the titration apparatus is operable with the same electrodes for test solutions having both acidic and alkaline pH values.

6. The titration recording apparatus of claim 3 wherein said given value of the speed of the motor means is a maximum value for the motor means, and the variation of the amplitude of the output of said voltage comparison circuit varies from zero to said given value when the voltage difference between said adjustable voltage source and the voltage across said electrode represents a small fraction of a pH unit.

7. The titration recording apparatus of claim 3 wherein said pH detecting electrodes have a direct current voltage thereacross which has a polarity which indicates whether the test solution is acidic or alkaline, said adjustable calibrated voltage source is a source of direct current voltage and the output of said voltage comparison circuit provides a direct current output voltage which is a measure of the difference between the electrode voltage and the output of the adjustable reference voltage source, and said motor control means including a control voltage generating circuit which responds to a voltage output of one polarity of said voltage comparison circuit by generating a control voltage of a first phase or polarity which operates the motor means in one direction only and will not operate the motor means if said voltage output is of opposite phase or polarity, and there is provided polarity reversing switch means for selectively providing a control voltage for said motor control circuit of the same magnitude but of opposite phase or polarity to that normally resulting from the output of said voltage comparison circuit.

8. The titration recording apparatus of claim 3 wherein said motor control means comprises: a unidirectional amplifier device having a pair of load terminals and a control terminal, a source of energizing voltage for said amplifier device, said variable speed motor means being connected in circuit with the load terminals of said amplifier device, said source of energizing voltage effective current flow through the load terminals of said amplifier device when current flow therethrough is permitted which drives said motor means in only one direction and at a speed which is dependent in part on the magnitude of the current flowing therethrough, said amplifier device normally having flow of current through the load terminal thereof when there is no control voltage on the control terminal thereof, which current flow would cause creeping of said motor means in said one direction, means responsive to the output voltage of said voltage comparison circuit for feeding a control voltage to the control terminal of said amplifier device to effect substantial increase in the conduction of current through the load terminals of said amplifier device to drive said motor and in said one direction, and variable impedance means connected to said motor means which variable impedance has a high impedance condition under the voltage condition where there is no control voltage on the control terminal of said amplifier device to reduce the energizing voltage applied to said motor means where the motor will not rotate, and a relatively low impedance condition under the voltage condition where there is a current increasing control voltage on the control terminal of said amplifier device.

9. The titration recording apparatus of claim 8 where said variable impedance means is a Zener diode connected to impede flow of current from said amplifier device under the first mentioned voltage condition and to act as a low impedance under the last mentioned voltage condition.

10. The titration recording apparatus of claim 3 wherein said motor control means includes: a phase control circuit comprising: a pair of unidirectional amplifier devices each having a pair of load terminals and a control terminal, a transformer having a primary winding and a center-tapped secondary winding, a source of alternating current of a given frequency connected to said primary winding, said load terminals of said amplifier devices being connected respectively to opposite ends of said secondary winding, wherein said amplifier devices may be rendered alternately conductive by the alternating voltage induced into said secondary winding from the primary winding, said variable speed motor means being connected to the center tap of said secondary winding wherein similar current pulses are fed to said motor means from said amplifier devices during successive half cycles when zero or the same current flow enabling control voltage is present on the control terminals of said devices during half cycles when conduction thereof is permitted, and dissimilar current pulses are fed to said motor means from said amplifier devices during said successive half cycles when a different flow enabling control voltage is present on the control terminals of said devices during the half cycles where conduction there is permitted, said similar current pulses normally causing rotation of said motor means in one direction or the other depending on the device which supplies the greater current, and said similar current pulses normally causing said motor to remain substantially stationary, said voltage output of said voltage comparison circuit being a direct current voltage, a converter circuit selectively operable to generate a square wave voltage of the frequency of and in synchronism with the alternating voltage in said secondary winding and which has an amplitude which varies with the amplitude of the direct current output of said voltage camparison circuit, means coupling the output voltage of said converter circuit to the control terminals of said amplifier devices which voltage is said current flow enabling control voltage wherein, depending on the phase thereof, current conduction of one of the amplifier devices is reduced and current conduction of the other of same is increased, switch means for shutting off current flow from the load terminals of one of said amplifier devices wherein the other amplifier device will continuously supply all the current to said motor means and will therefore, normally always tend to rotate the motor means in one direction, and for permitting such current flow for calibration purposes, and variable impedance means connected to said motor means which variable impedance means has a high impedance condition under the voltage condition where there is no control voltage on the control terminal of said other amplifier device, to reduce the energizing voltage applied to said motor means to said minimum value where the motor will not rotate, and a relatively low impedance condition under the voltage condition where there is a current increasing control voltage on the control terminal of the latter amplifier device.

11. The titration apparatus of claim 10, where said variable impedance means is a Zener diode connected to impede flow of current from said amplifier devices under the first mentioned voltage condition and to act as a low impedance under the last mentioned voltage condition.

12. The titration recording apparatus of claim 3 wherein said motor control means includes: a phase control circuit comprising: a pair of unidirectional amplifier devices each having a pair of load terminals and a control terminal, a transformer having a primary winding and a center-tapped secondary winding, a source of alternating current of a given frequency connected to said primary winding, said load terminals of said amplifier devices being connected respectively to opposite ends of said secondary winding, wherein said amplifier devices may be rendered alternately conductive by the alternating voltage induced into said secondary winding from the primary winding, said variable speed motor means being connected to the center tap of said secondary winding wherein similar current pulses are fed to said motor means from said amplifier devices during successive half cycles when zero or the same current flow enabling control voltages is present on the control terminals of said devices during half cycles when conduction thereof is permitted, and dissimilar current pulses are fed to said motor means from said amplifier devices during said successive half cycles when a different flow enabling control voltage is present on the control terminals of said devices during the half cycles where conduction thereof is permitted, said similar current pulses normally causing rotation of said motor means in one direction or the other depending on the device which supplies the greater current, and said similar current pulses normally causing said motor to remain substantially stationary, said voltage output of said voltage comparison circuit being a direct current voltage, a phase inversion and converter circuit selectively operable to generate a square wave voltage of the frequency of, and in synchronism with, the alternating voltage in said secondary winding and which has an amplitude which varies with the amplitude of the direct current output of said voltage comparison circuit and has either one of two possible phases which are 180 degrees out of phase with one another, means coupling the output voltage of said phase inverter and converter circuit to the control terminals of said amplifier devices which voltage is said current flow enabling control voltages wherein, depending on th phase thereof, current conduction of one of the amplifier devices is reduced and current conduction of the other of same is increased, switch means for shuting off current flow from the load terminals of one of said amplifier devices, wherein the other amplifier device will continuously supply all the current to said motor means and will therefore normally always tend to rotate the motor means in one direction, and for permitting such current flow for calibration purposes, and variable impedance means connected to said motor means which variable impedance means has a high impedance condition under the voltage condition where there is no control voltage on the control terminal of said other amplifier device, to reduce the energizing voltage applied to said motor means to said minimum value where the motor will not rotate, and a relatively low impedance condition under the voltage condition, where there is a current increasing control voltage on the control terminal of the latter amplifier device.

13. In a recording pH stat apparatus responsive to pH variations in a test solution undergoing a chemical reaction, said titration apparatus including: pH detecting electrodes insertable into said test solution and providing a direct current voltage of a magnitude which is a measure of the degree of acidity or alkalinity of the test solution and a polarity which indicates whether solution is acidic or alkaline, a manually adjustable calibrated direct current voltage source having successive positions of adjustment where the voltage output progressively varies in steps representing the output of said electrodes at various pH values on opposite sides of a neutral pH, a voltage comparison circuit providing a direct current voltage output which is a measure of the difference between the electrode voltage and the output of said voltage source, a container having a supply of liquid titration material which, when added to a test solution having a non-neutral pH, will oppose the change in the pH thereof, recording means for recording the amount of titration material added to said test solution, a feed conduit connecting the liquid in said container to said test solution, and a liquid displacing feed element progressively movable into said container to displace said titration material from said container into said feed conduit where it is delivered to said test solution, the improvement comprising variable speed motor means for simultaneously progressively moving said feed element into said container and operating said recording means to record the value of titration material displaced from said container into said test solution in response to the feeding of energizing voltage thereto, said motor means having a speed characteristic which varies progressively from zero to a given value with the variation in the amplitude of the energizing voltage fed thereto from a given minimum value to a given value, and motor control means responsive to the voltage output of said voltage comparison circuit by feeding energizing voltage to said motor means to drive the same in only the direction which moves said feed element further into said container and which has an amplitude which progressively varies from said minimum value when the output of said voltage comparison circuit is zero and increases with the increase of said output from said minimum value.

References Cited

UNITED STATES PATENTS

| | | | |
|---|---|---|---|
| 2,770,531 | 11/1956 | Hawes et al. | 23—253 X |
| 2,994,590 | 8/1961 | Brems | 23—253 |
| 3,157,471 | 11/1964 | Harrison | 23—253 |
| 3,160,477 | 12/1964 | Wasilewski | 23—253 |
| 3,186,800 | 6/1965 | Strickler | 23—253 |
| 3,246,952 | 4/1966 | Dawe | 23—253 |
| 3,254,494 | 6/1966 | Chartouni | 62—3 |
| 3,023,936 | 3/1962 | Marsh et al. | 222—318 X |

J. SCOVRONEK, Primary Examiner

U.S. Cl. X.R.

62—3; 318—227, 230, 231